United States Patent [19]
Basu

[11] Patent Number: 5,546,416
[45] Date of Patent: Aug. 13, 1996

[54] COOLING SYSTEM AND MOUNTING FOR SLAB LASERS AND OTHER OPTICAL DEVICES

[75] Inventor: Santanu Basu, Rancho Palos Verdes, Calif.

[73] Assignee: Northrop Grumman Corporation, Los Angeles, Calif.

[21] Appl. No.: 419,589

[22] Filed: Apr. 10, 1995

[51] Int. Cl.⁶ ........................................................ H01S 3/04
[52] U.S. Cl. ................................ 372/34; 372/11; 372/92; 372/66
[58] Field of Search ............................... 372/34, 66, 92, 372/98

[56] References Cited

U.S. PATENT DOCUMENTS

| | | | |
|---|---|---|---|
| 3,633,126 | 1/1972 | Martin et al. | 331/94.5 |
| 4,852,109 | 7/1989 | Kuchar | 372/34 |
| 4,972,426 | 11/1990 | Steffen | 372/66 |
| 5,034,953 | 7/1991 | Sekiguchi | 372/34 |
| 5,237,580 | 8/1993 | Mefferd | 372/66 |

OTHER PUBLICATIONS

Byer, R. L. "Diode Laser-Pumped Solid-State Lasers", Science, vol. 239 (12 Feb. 1988) pp. 742-747.
Basu, S. and Byer, R. L., "40-W average power, 30-Hz moving-slab Nd:glass laser" Opt. Ltrs. vol. 11, No. 10 (Oct. 1986) pp. 617-6-9.

Primary Examiner—Leon Scott, Jr.
Attorney, Agent, or Firm—Terry J. Anderson; Karl J. Hoch, Jr.

[57] ABSTRACT

Apparatus for extracting heat from objects such as a slab laser having an accessible flat surface subject to being heated and including a flat strip of material, preferably made from wafer grade semiconductor, such as silicon or gallium arsenide, and mounted in close proximity to the surface so as to leave a small gap therebetween of uniform thickness over an area of said surface to be cooled. A still gas fills the volume of the gap which is sufficiently small that the gas serves as an effective heat transfer medium from said surface to said strip from which heat is transferred to a medium mounted in thermal contact with the strip on the side away from said surface being cooled. The invention has particular application to the cooling of slab lasers.

12 Claims, 2 Drawing Sheets

COOLING SYSTEM AND MOUNTING FOR SLAB LASERS AND OTHER OPTICAL DEVICES

FIELD OF THE INVENTION

This invention relates to the cooling of lasers optical devices and other heat generating devices with a flat surface and more particularly to the cooling of diode pumped slab lasers.

BACKGROUND OF THE INVENTION

Diode laser-pumped neodymium lasers (Nd:YAG, for example) have proven a very useful source of green and blue laser radiation by frequency doubling with non-linear crystals. Other materials have also been used to develop solid-state lasers for use over other portions of the spectrum. For a review of the early state of the diode pumped laser art, reference is had to the article "Diode Laser-Pumped Solid-State Lasers" by Robert L. Byer, *Science*, Vol 239, pp 742–747 (1988).

Slab geometry has now been found preferable to more traditional rod geometry for the solid state component in diode pumped lasers, but, as power outputs have increased, effort have been required to control the heat generated in slab laser operation. While the geometry of the slab laser itself reduces the thermal problem to those in a single dimension, the remaining thermal requirements still represent a limitation in the power performance of diode-pumped slab lasers.

Slab lasers which are used to develop significant amounts of power are often configured for pumping through the side faces of the slab. During operation considerable heat is generated within the lasing slab which is, itself, a relatively poor thermal conductor. This condition, therefore, sets up the requirement that the slab be directly cooled by some means.

Current slab lasers which emit powers greater than several watts have required either direct liquid contact with the slab or intimate contact between the slab and a metal heat sink. Liquid coolants change the optical boundary conditions of the slab for total internal reflection (TIR), which is correctable, if inconvenient; however liquid may not touch the slab ends where it will cause losses and phase distortions. Therefore, a liquid seal is necessary around a rectangular slab. Also, sometimes the ions in the slab leach out into the cooling liquid, and the liquid itself must be pumped past the slab and through the cooling member. All of these requirements add mechanical complexity to the design.

Where metals have been brought into contact with the slab, their inherent roughness (aluminum, for example, cannot be made to the required smoothness) allows only imperfect contact, leaving a print of a portion of the surface in contact interspersed with irregular air pockets and therefore is a poor arrangement as a thermal conductor. The slab may not be put into contact with a material which either absorbs the optical radiation (most metals) or which violates the TIR condition at the location of the reflections from the top and bottom surfaces. Therefore the slab may not be contacted with a metal or silicon for that matter for heat removal.

The part of the optical wave which bounces at the surface extends beyond the surface boundary into the neighboring medium up to a distance determined by the dielectric properties of the slab and the neighboring medium. When the Nd-YAG slab is in contact with air, this evanescent wave extends into the air to a distance of approximately 1 micron at the laser wavelength. This sets the minimum gap thickness but does depend on the material properties and the optical wavelength.

There has also been proposed the use of a thin layer of PTFE fluoroplastic coated onto the slab or onto a metal support for being pressed into intimate contact against the slab. Due to limitations in mechanical tolerances, the thermal resistance is nonuniform and high, and any application of stresses to reduce the thermal resistance due to poor contact introduces loss due to depolarization and distortion into the circulating laser beam.

There is, therefore, a need for an improved cooling system and mounting for use in slab lasers.

SUMMARY OF THE INVENTION AND OBJECTS

It is a general object of the present invention to provide a cooling system and mounting for solid state pumped slab lasers which will overcome the above limitations and disadvantages.

It is a further object of the invention to provide cooling and mounting system of the above character which eliminates thermal problems such as focusing and depolarization so that scaling to high average power becomes possible.

It is a further object of the invention to provide a cooling and mounting system of the above character which replaces liquid coolants and seals around the slab laser medium.

The present invention is predicated on the realization that a slab of active material in slab lasers of the type described can be cooled by heat transfer through a still, (i.e., non-moving) volume of gas interposed between the slab and a closely spaced high heat conductivity strip forming, with the slab, the boundary for the gas volume, provided that the distance of the gap between the slab and the strip is made extremely small, that is to say, from about 1 micron to about 10 microns, and preferably from about 1 micron to about 6 microns. Generally it has been a requirement that the surfaces of the slab and the strip be polished to within about one-eights (1/8ths) of a wavelength of the laser energy being generated, for purposes of internal reflection of the coherent light beam, and such surfaces are found to be satisfactory for use in the present invention as the gap distance specified. Suitable gases for filling the gap volume include air and helium. Suitable materials for the strip include silicon or gallium arsenide wafer semiconductor material. These materials are given by way of example.

It will be shown that the thermal problems in diode pumped slab lasers can be resolved by using a novel thermal mounting construction which uses the above principles in accordance with the invention.

These and other features and objects of the invention will become apparent from the following detailed description which taken with the accompanying drawings, of which:

DETAILED DESCRIPTION OF THE PREFERRED EMBODIMENTS

Figure 1:
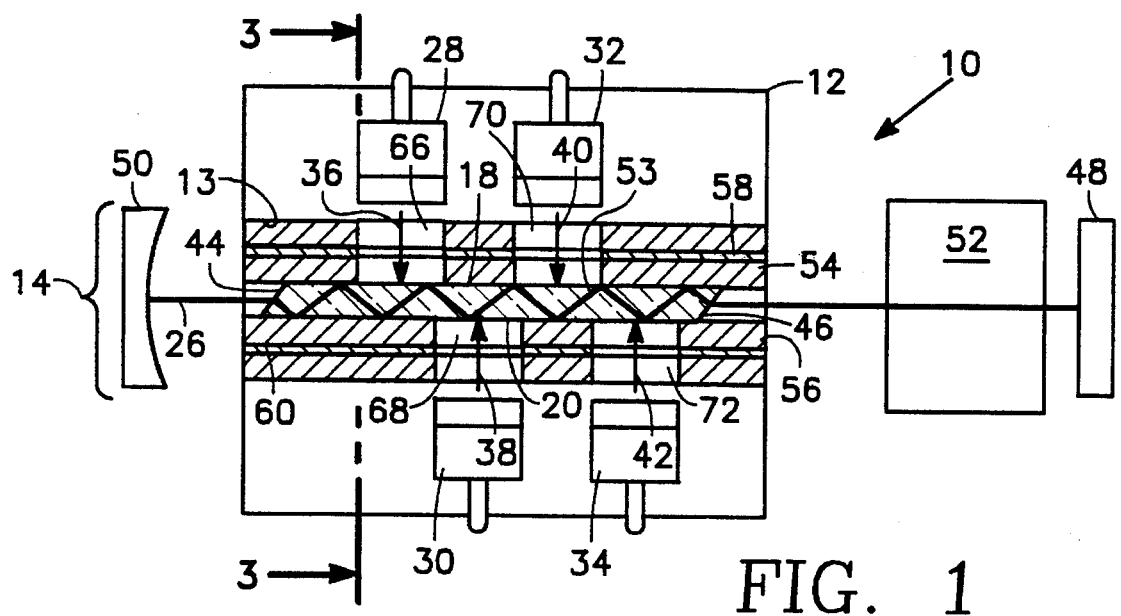
FIG. 1 is a diagrammatic elevational view, partially in cross section, of a cooling system and mounting for a diode pumped slab laser constructed in accordance with the present invention.
Figure 3:
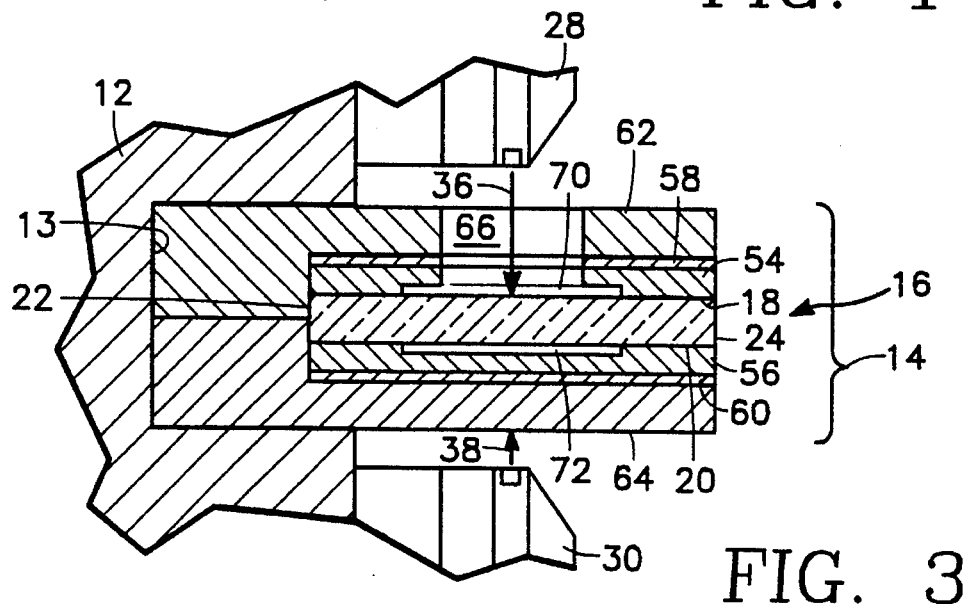
FIG. 3 is a cross-sectional view of the cooling system and mounting portion of the laser of FIG. 1 taken along the lines 3—3 thereof.
Figure 2:
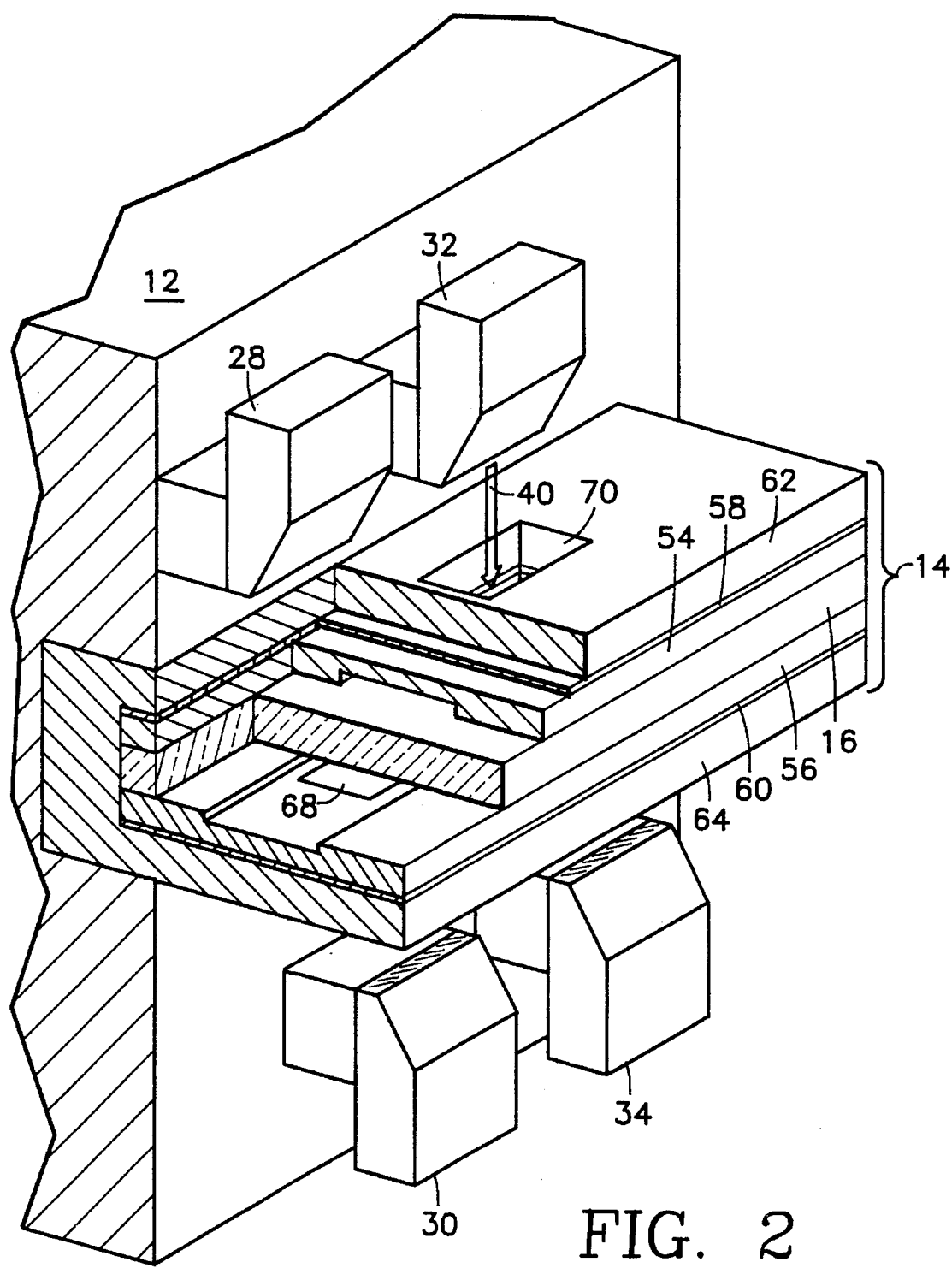
FIG. 2 is a perspective view, partly in cross section, of the cooling system and slab laser of FIG. 1.

Referring to FIGS. 1 through 3, the slab laser 10 of the present invention is shown and generally comprises a housing 12 having a slot 13 therein for receiving a slab laser assembly 14 including an elongate slab body 16 of an active laser medium. The slab body 16 is of rectangular shape in cross section and is provided with high optical quality, flat upper and lower surfaces 18, 20 and side walls 22 and 24.

The slab body 16 can be made of any of the known solid state laser materials which can be pumped in a slab laser configuration. Of these, the following materials have been widely reported in the literature and are suitable for use herein: neodymium yttrium aluminum garnet (Nd:YAG); neodymium in glass (Nd:glass); neodymium yttrium lithium fluoride (Nd:YLF); neodymium lithium niobate (Nd:LiNbO$_3$); and chromium in sapphire (Cr:Al$_2$O$_3$). Specific references to frequencies and dimensions made in this description are to be taken by way of example only and apply to the use of Nd:YAG. It is to be understood, however, that the invention herein applies to the cooling of any solid state slab laser.

Slab 16 is formed or shaped as an elongate body and generally can have any rectangular cross-sectional dimension and length practical for operation of such lasers, as the present invention is readily scaled over a wide range of dimensions and a particularly wide range of lengths.

A laser beam 26 is propagated through the slab from one end to the other, having been generated by transverse pumping by a series of solid state diodes 28, 30 and 32, 34 mounted to the face of housing 12 and arranged in an alternating pattern above and below the slab assembly 14, as shown.

The pumping lasers diodes 28–34 are of solid state design having outputs 36, 38, 40, and 42 transversely directed into the slab body to create a population inversion in the laser material to obtain laser action.

The slab is provided with end faces 44, 46 cut at the Brewster angle for non-reflective transmission of the beam into and out of slab 16. A optical resonator consisting of a flat output coupler mirror 48 and a concave mirror 50 are mounted externally of the slab to define a resonant optical cavity (1.06 μm, for Nd:YAG). The cavity is optically aligned and in communication with the Brewster angle end faces 44, 46 and the path of the beam through the slab. The slab laser beam is acousto-optically Q-switched using a fused quartz Q-switch 52 in the cavity to generate radiation to which output coupler mirror 48 is partially transparent. In this particular laser system, an acousto-optic Q-switch was located inside the cavity to generate short pulses of Q-switched radiation from the slab at 1064 nm.

The optical resonator and slab are constructed and arranged so that the beam is propagated through the slab at an angle to the elongate axis or length of the slab 16 so as to be totally internally reflected from the upper and lower surfaces 18 and 20 so that the beam passes along a zig-zag path 53. Upper and lower surfaces 18,20 are generally ground and polished to a high degree of optical flatness.

Typically, the upper and lower surfaces of the slab 16 are polished flat to within less than one-eighth of a wave length of the radiation of the beam being generated.

During operation, the laser diode pumping arrangement develops a significant thermal gradient within the slab which, if not dissipated, causes poor laser operation. This, therefore, requires an effective cooling system to which the present invention is directed.

The slab assembly is best seen in FIG. 3 and comprises a layered sandwich structure with the slab body 16 disposed in the middle. Immediately above and below the body are disposed thermally conductive layers or strips 54, 56 to outside of which are closely mounted thermally conductive pad layers 58, 60. The slab body, the strips, and the pads are in thermally conductive contact with each other and supported from the outside in a pair of assembly blocks 62, 64 of metal such as aluminum to form the assembly 14 which is then positioned in slot 13 for operation.

The assembly blocks 62, 64, strips 54, 56, and pad layers 58, 60 are channelled to form access ports or openings 66, 68, 70, 72 therethrough to the slab body for admitting the laser diode outputs 36–42 from the respective side of the assembly of the diode.

As shown, the openings 66–72 are formed in a staggered row, alternating from one side of the assembly to the other to match the diode positions. On the side opposite from each of the openings, the layers remain intact, in full section and serve the cooling function to be described.

Referring now to FIG. 3, means is provided for cooling the slab laser through the wall opposite to that being pumped, and generally consists of the aforementioned layers or strips 54, 56 together with gas filled gaps 70, 72 between the slab body and the respective strip. To this purpose, each of the strips is made with an elongate channel 74 therein facing the adjacent slab to form therewith the gaps 70, 72 which contain and define a thermal transfer gas volume, filled preferably with air or helium.

The strips 54, 56 can be made of metal or other material, but are preferably made of a material which can be formed and polished to a micro-finish of the same roughness as the slab itself (i.e., one-eighth of a wavelength of the light beam being generated). Metals are not readily brought to this state of finish, if they can be brought there at all.

The thermally conductive strips 54, 56 are preferably made from highly polished semiconductor wafer material which may, for example, be selected from silicon and gallium arsenide materials or other materials having good thermal conductivity and physical properties such as indium phosphide, sapphire, diamond, or undoped YAG.

With the limitation of the conductivity of air which requires that the gap be exceedingly small, it is found that a semiconductor material such as silicon or gallium arsenide is preferred for making the strip since they have the requisite high thermal conductivity and the smoothness of finish to allow an exceptionally small gap to be used which can be filled with air, even though air is not a particularly good thermal conductor.

Moreover, semiconductor material is chosen for this application because of the ready availability of highly polished, dimensionally stable silicon and gallium arsenide wafers from which the strips can be made by existing lithography processes to form channels (74) of as low as 0.1 micron depth, and also because the thermal expansion and heat transfer characteristics of these wafers are compatible with those of the slab laser materials used herein.

The strips 54, 56 are polished to a very high degree so that it becomes possible to obtain an extremely small dimension for the gas-filled gaps between each with one of the surfaces of the slab and the adjacent strip.

The smoothness or flatness specification for the semiconductor strips is commensurate with that of the slab so that close spacing there between can be established while maintaining the gap as small as possible. Typically for a gap distance of about ten microns, the semiconductor strip surfaces should be polished to three (3) to four (4) micron smoothness; while for a gap of two microns a semiconductor strip surface should be polished to one-half of one micron. Generally speaking, a gap range from about two to ten microns is found satisfactory, and may extend up to 15 microns.

A thermally conductive gas fills the gap between the strip and the slab and can consist of air or other non-reactive gas such as helium. While the gap when filled with air is not highly conductive, it nevertheless is so small as that it is still very effective in conducting heat from the slab to the strip when dimensioned as disclosed herein. This completes the thermally coupled arrangement consisting of the air gap and the strip.

The conductive heat transfer follows the Fourier equation which states that the temperature rise, $\Delta T$, across a gap $\Delta x$, in a material of thermal conductivity, k, for a heat flow rate of Q through a heat transfer area of A is given by $\Delta T = -(\Delta x/k) Q/A$. The thermal conductivity of air is 0.023 W/mK as compared to that of copper of 370 W/mK. The only way to reduce the temperature rise in air is to reduce the gap thickness to compensate for its poor thermal conductivity. Thus, a 10 micron thick air gap will have the same temperature rise across it as a 16 cm thick copper block at the same heat flux.

Thermal heat transfer layers or pads 58, 60 contact the semiconductor strip on the side opposite the slab contact surfaces for removing heat and conducting it into the mounting assembly.

Figure 4:
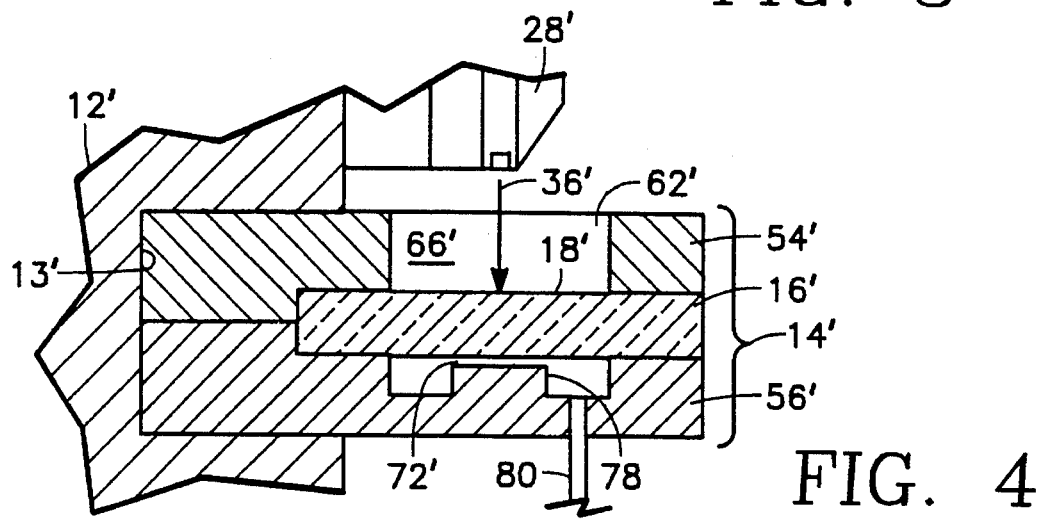
FIG. 4 is a cross-sectional view, similar to that of FIG. 3, of a cooling system for an alternative embodiment of slab laser constructed in accordance with the present invention.

The thermal cooling operation of the invention is readily seen from the above description in that each of the laser diode outputs from one side of the slab generates heat which is removed from the other side by conduction through the small gap of gas, and thence through the semiconductor strip to the mounting block An alternate embodiment of the invention is shown in FIG. 4. In this embodiment, helium is used to fill the gap and the nearly six-times greater thermal conductivity of helium compared to air allows larger gap and a surface finish specification that can be met by metal, including aluminum. In FIG. 4 like parts have been given like numbers as their counterparts in FIGS. 1–3 with the addition of a prime ('). The function of the semiconductor strips is now done by a raised strip of the same metal as the mounting block is made and integrally formed along the midline and length of the lower mounting block. Metal strip defines a gap with the slab which is larger than that of the embodiments of FIGS. 1–3 but this added gap dimension is overcome by the added thermal conductivity of helium.

As a general consideration, air is one of the poorest conductors, and hence just about any gas, such as carbon dioxide, ammonia etc work as well as air. Helium or hydrogen could be used to increase the performance. For helium, the easiest thing to do is to let a slow flow of helium to fill the gap and surrounding area, and not to worry about helium sealed devices which are hard to construct. Helium will work just as in the present system, and will not obstruct pumping by diodes from both sides. Thus, while a 4 to 10 micron gap size is specified at the preferred range for the present invention, it could be larger or smaller depending on what other element, such as the gas for the gap, is optimized.

To those skilled in the art to which this invention pertains, many improvements and modifications will occur, as well as many generalizations of the techniques disclosed herein. For example, the present invention will be found to apply to many other systems for extracting heat from an object having an accessible flat surface by providing a flat strip of material of high heat conductivity selected from the group of sapphire, YAG, indium phosphide and diamond as well as the semiconductor materials disclosed as preferred herein in which means are for mounting the strip in close proximity to the object so as to leave a small gap therebetween of uniform thickness over an area of said surface to be cooled which gap is filled with a still gas filling. The gap should be sufficiently small that the gas serves as an effective heat transfer medium from said surface to the strip, which itself is mounted in thermal contact with a heat transfer medium on the side away from said surface being cooled.

Accordingly, the present invention is to be taken in a broad sense as including such improvements and is to be limited solely by the accompanying claims.

What is claimed is:

1. A slab laser and cooling system therefor, comprising:

an elongate slab of generally rectangular cross-section and made of a material for serving as a lasing medium, said slab having a pair of opposed end faces from which laser energy is extracted and further generally establishing an optical axis through said slab from one end face to the other, an optical cavity formed about said slab and in alignment with said axis, said slab further having a pair of opposed, flat side walls generally in alignment with, parallel to and alongside said optical axis, a pumping laser positioned alongside said slab and having an output directed into said slab transversely thereof from one side and through one of the side walls of said slab, the energy of said pumping laser causing both optical excitation and lasing action in said optical cavity and the generation of heat in said slab, a flat strip of solid material of good thermal conductivity, means for mounting said strip in spaced relation and adjacent to said side wall of said slab on the side opposite from said pump laser to form a gap with said slab of uniform thickness along the length thereof said slab in the region opposite to that exposed to said laser pump output, a gas filling said gap, said gap thickness being sufficiently small that said gas serves as an effective heat transfer medium between said slab and said strip, and means forming a thermal transfer medium mounted in thermal contact with said strip for removing heat therefrom.

2. The slab laser and cooling system as in claim 1 further in which:

said strip of material is made of semiconductor.

3. The slab laser and cooling system as in claim 2 further in which said semiconductor strip is made from wafer grade silicon or gallium arsenide.

4. The slab laser and cooling system as in claim 3 further in which said gap is from 4 to 10 microns thickness.

5. The slab laser and cooling system as in claim 3 in which said semiconductor strip is provided with a surface finish of smoothness less that 1 micron.

6. The slab laser and cooling system as in claim 1 further including a plurality of pumping lasers positioned at spaced locations alongside said slab, and in which said gap and strip is located on the side of said slab away from said pump laser outputs.

7. The slab laser and cooling system as in claim 1 further including a plurality of pumping laser positioned at spaced locations alongside said slab, and in staggered positions first on one side and then the other, and further in which a second strip of material of good thermal conductivity is mounted on the side of said slab opposite from said first strip, each of said strips having channels therein for allowing the output of the adjacent pump laser to pass into said slab, while the other strip remain in full section on the opposite side from said channel to remove heat generated by said pump laser output.

8. The slab laser and cooling system as in claim 1 further in which:

said optical excitation following a zig-zag path through said slab and reflected off said opposed side walls by internal reflection.

9. The slab laser and cooling system as in claim 1 further in which:

said gap serves to maintain a gas to solid slab interface therealong for internal reflection of the beam within said slab and along said zig-zag path.

10. A slab laser comprising:

an elongate slab of generally rectangular cross-section and made of a material for serving as a lasing medium, said slab having a pair of opposed end faces from which laser energy is extracted and further generally establishing an optical axis through said slab from one end face to the other, an optical cavity formed about said slab and in alignment with said axis, said slab further having a pair of opposed, flat side walls generally in alignment with, parallel to and alongside said optical axis, a plurality of pumping lasers positioned alternately on one side and then the other alongside said slab and having outputs directed into said slab transversely thereof from and through said side walls, the energy of said pumping laser causing both optical excitation and lasing action in said optical cavity and the generation of heat in said slab, a pair of flat strips of solid material of high heat conductivity, means for mounting said strip in spaced relation and adjacent to said side walls, said strips being continuous on the side opposite from each said pump laser to form a gap therewith of uniform thickness along the length of said slab in the region opposite to that exposed to said laser pump energy and further having openings therethrough for the passage of said pumping laser outputs, a gas filling said gap, said gaps being sufficiently small that said gas serves as an effective heat transfer medium between said slab and said strip, and means forming a thermal medium mounted in thermal contact with said strips for removing heat therefrom.

11. In a slab laser, apparatus for extracting heat from an element therein, said element having an accessible flat surface, comprising:

a flat strip of material of high heat conductivity, means for mounting said strip in close proximity to said element so as to leave a small gap therebetween of uniform thickness over an area of said surface to be cooled, a still gas filling the volume of said gap, said gap being sufficiently small that said gas serves as an effective heat transfer medium from said surface to said strip, and a heat transfer medium mounted in thermal contact with said strip on the side away from said surface being cooled to thereby extract heat from said strip and said element.

12. Apparatus as in claim 11 in which the material of said strip is selected from the group of semiconductors, sapphire, indium phosphide, YAG and diamond.

* * * * *